Patented July 13, 1948

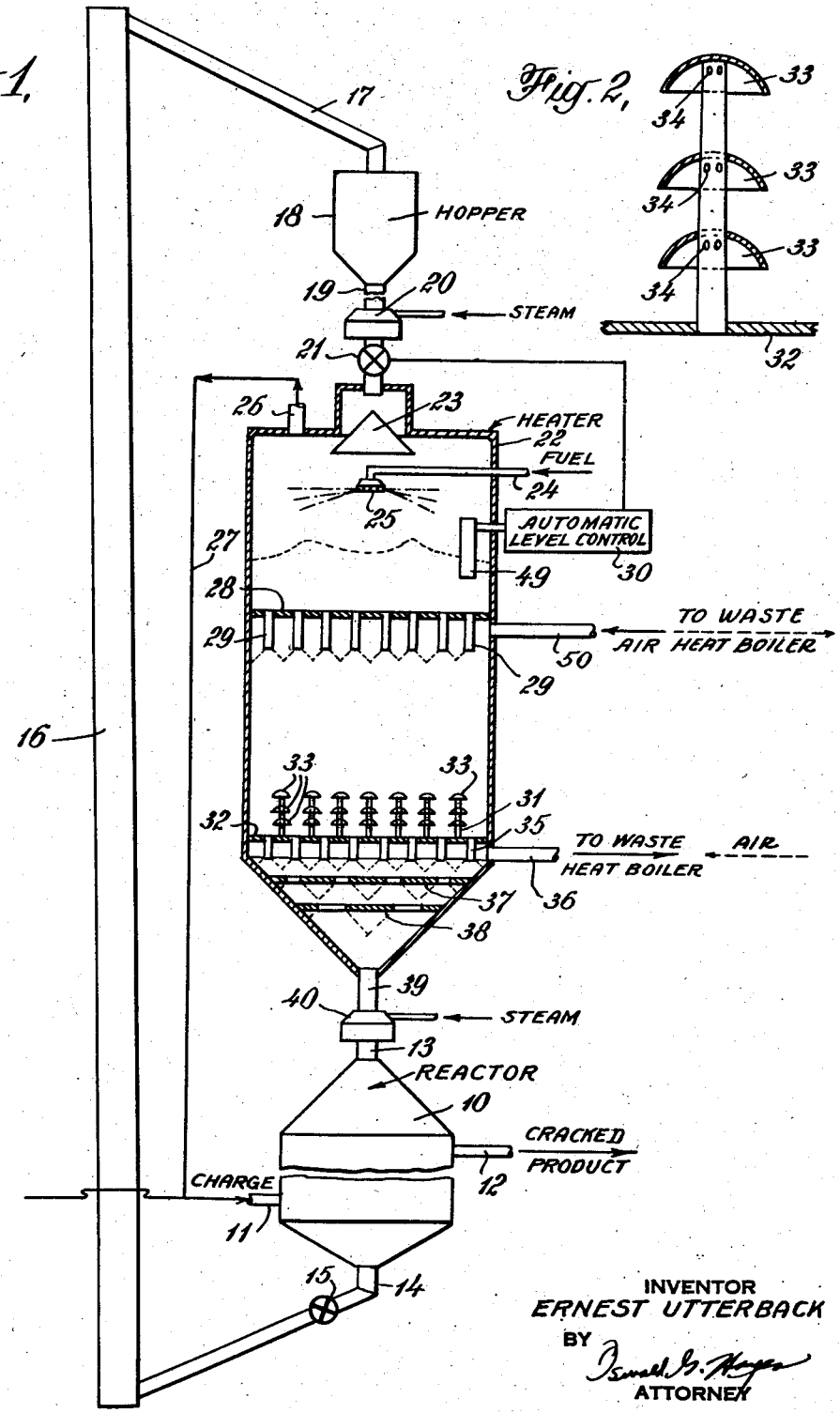

2,445,092

UNITED STATES PATENT OFFICE 2,445,092

PROCESS AND APPARATUS FOR HEAT TRANSFER WITH GRANULAR SOLIDS

Ernest Utterback, New York, N. Y., assignor to Socony-Vacuum Oil Company, Incorporated, a corporation of New York Application August 2, 1946, Serial No. 687,901

17 Claims. (Cl. 196—55)

This invention relates to method and means for transferring heat by means of a granular solid heat transfer agent and is particularly concerned with a heating process and apparatus for rapidly and efficiently raising the temperature of the granular solid heat transfer agent. In one specific embodiment the invention contemplates transfer of heat from the novel heater of this invention to a reactor by means of a granular solid and contacting a hydrocarbon charge with the granular solid in the reactor to crack the charge under carefully controlled conditions of temperature and reaction time. According to this preferred embodiment of the invention, a portion of the hydrocarbon charge is derived from the heater.

For many purposes, transfer of heat by means of a granular solid has been found to be extremely effective. Thus, contact with a granular solid at elevated temperature may be used effectively to vaporize liquids and solids and to induce high temperature reactions where the rate of heating, average temperature, maximum temperature and residence time at elevated temperature are important factors. The process is found particularly advantageous where the conversion, either in physical state or chemical constitution, may result in fouling of metallic heat transfer surfaces such as tubes and shell stills.

An exemplary process is the conversion of high boiling hydrocarbons to low molecular weight olefins such as ethylene and acetylene by reaction at high temperature for short reaction periods. Thus, gas oils, propane and ethane may be converted at temperatures on the order of 1350 to 1800° F. to high yields of ethylene. The reaction time varies inversely with the temperature and, in general, higher temperatures are required for lower molecular weight hydrocarbons. Yields on the order of 30% by weight of ethylene may be obtained by cracking gas oils at 1450° F. for 0.2 second. This process of cracking hydrocarbons is disclosed herein as exemplary for purposes of illustration and is not to be taken as limiting of the invention.

In a preferred embodiment, a portion of the hydrocarbon charge for a cracking process is derived from a preparatory stage of the heater and, in this aspect, the invention is directed to hydrocarbon cracking.

It has been found that a number of difficulties are encountered in attempting to attain maximum efficiency and minimum maintenance costs in a heater for the purposes described above. Pre-mix burners must be carefully controlled as to number and operation in order to limit flame temperatures to those which will not induce fusion of the granular solid in the immediate vicinity of the burner. On the other hand, the combustion must be so conducted as to obtain reasonably complete conversion of carbon to carbon dioxide within the actual heating zone since residual amounts of carbon monoxide in excess of the equilibrium quantities will result in combustion of the carbon monoxide in flues, waste heat boilers and the like to give unduly high temperatures in portions of the apparatus not designed for handling elevated temperatures. This "afterburning" may result in burning out of flues and tubes of waste heat boilers.

According to the present invention, highly efficient heating of the granular solid is obtained by coating the granules or efficiently mixing the same with a fuel which is thereafter burned by passing air in direct contact with the granules in a compact downwardly moving bed. By this means, combustion takes place uniformly throughout the compact bed of particles and temperatures can readily be controlled to be maintained below fusion temperature of the solid and above the ignition point of carbon monoxide.

Flow of combustion air through the compact bed may be either concurrent or countercurrent. Each type of flow has advantages peculiar to it and the characteristics of combustion should be examined in connection with the particular problems involved to design a heater for best flow in any desired use. Under conditions of countercurrent flow, the air is first brought into contact with small residual amounts of fuel in the presence of granules at high temperature and combustion of the residual fuel readily takes place. As the air passes upwardly through the bed it contacts progressively greater amounts of more readily burned fuel and flame temperatures are minimized because the regions of high fuel concentration are regions of low oxygen concentration. Additionally, the flue gases from countercurrent flow are at about the same temperature as the incoming solid, thus making more effective use of the fuel in the heater and leaving less residual heat to be recovered in waste heat boilers and the like.

On the other hand, concurrent flow of air results in flue gases of maximum temperature thus minimizing the chance of large residual amounts of carbon monoxide which may burn in flues and the like to produce disadvantageous results and low levels of economic operation. These and other objects and advantages of the invention are best brought out by reference to a specific process adapted to be practiced in apparatus shown in the annexed drawings; wherein Figure 1 is a generally diagrammatic view of the apparatus for the cracking of hydrocarbons, showing the heater in vertical section; and Figure 2 is a detail view showing a preferred construction of collection or distributer elements for the bottom of the heater.

Gas oil is readily cracked to high yields of ethylene by passing the charge in liquid phase to the bottom of a downwardly moving compact bed of granular solids in a reactor 10. The liquid charge is admitted by line 11 and vaporized by contact with hot granular solid, the vapors passing upwardly through progressively hotter granules to be rapidly cracked and the cracked product is removed at discharge line 12 and rapidly quenched to a temperature at which the cracking reaction is substantially inhibited. Granular solid at a temperature of about 1575° F. is admitted to the top of reactor 10 from feed leg 13 and is cooled to about 900° F. by passing through the reactor. Granular solid at this temperature is discharged through conduit 14 having a valve 15 to an elevator 16. The granular solid from the top of elevator 16 is transferred to conduit 17 to a supply hopper 18 from which the granular solid passes downwardly through feed leg 19 having a steam sealing zone 20 and a valve 21 to a heater 22.

The granular solid entering the top of heater 22 is deflected toward the walls of heater 22 to give a shower of free falling discrete particles of heat transfer agent. As shown, this result may be obtained by dropping the solid onto a conical spreader 23. A fuel from pipe 24 is sprayed into the shower of solid granules from a spray head 25 and is thus caused to coat and thoroughly mix with the particles falling through the top of heater 22.

Any fuel which is predominantly non-volatile at the temperature of the granules entering heater 22 may be employed. Thus, heavy residual fuel oil such as bunker C is eminently satisfactory. The process is also adaptable to the use of solid fuels, particularly those which can be caused to intumesce and thereby coat the granules, for example, many of the readily available coals.

Many of the fuels adapted to the present purpose are partially volatile at the temperature of the incoming granules and vapors will be evolved from the fuels sprayed into the top of heater 22. These vapors are advantageously withdrawn at discharge port 26 and transferred by line 27 to be mixed with the charge for reactor 10, as shown in Figure 1. If it is desired to insure that all the charge enters reactor 10 as liquid, the vapors from port 26 may be condensed by inserting a suitable heat exchanger in line 27. Alternatively, charge may be introduced through line 11 in vapor phase by vaporizing a gas oil in a suitable tube still and mixing therewith vapors from line 27.

The granular solid is caused to accumulate in the upper portion of heater 22 as a compact bed of granules coated and/or mixed with fuel from spray head 25. This bed is sustained by plate 28 and a suitable upper level is maintained by installing a level responsive element 29 connected with an automatic level control 30 which serves to operate valve 21. Among the devices suitable for level control are reciprocating rods and electrical devices such as condenser plates which indicate the level by detecting changes in the capacity of the condenser with change in the nature of the dielectric between the plates.

Granular solid is transferred through a zone of restricted cross section from the solid bed above plate 28 to the combustion zone therebelow. The restricted cross section of the transfer means has a strong inhibiting effect on gas flow across the plate 28 and thus maintains an adequate gas seal across the plate so long as excessive pressure differentials are avoided. In the embodiment shown, transfer is by means of feed pipes 29 depending from the plate 28 which give uniform distribution across the top of the bed in the combustion zone and also provide a plenum chamber above the combustion bed. In the case of concurrent flow of preheated combustion air, the latter is admitted by pipe 50 to the plenum chamber below plate 28 and passes downwardly through the bed to suitable collecting devices in the lower portion thereof. As shown in Figure 2, the collecting devices consist of upright pipes 31 mounted on and passing through a plate 32 and having a plurality of inverted cup shaped member 33. The cups 33 receive gases of combustion which pass through orifices 34 in the pipes 31 to be diverted to a plenum chamber below plate 32 about draw-off pipes 35. The combustion gases are then passed by pipe 36 to a waste heat boiler and thence to the stack. Plates 37 and 38 below the plate 32 serve to induce uniform rate of flow through the several pipes 35 and thus cause uniform rate of flow throughout the combustion zone. The highly heated granular solid, for example at 1600° F. is transferred by feed line 39 having a steam sealing zone 40 to the reactor 10 for completion of its cycle.

It will be readily apparent how the same apparatus may be employed for passing combustion air in countercurrent contact with the granular solid in heater 22 by admitting preheated air through pipe 36 and withdrawing products of combustion by pipe 50. This alternative type of operation is illustrated in the drawing by broken line arrows.

I claim:

1. A process for cracking hydrocarbons which comprises passing a granular solid heat transfer material downwardly through a heating zone as a compact moving bed, passing the heated material downwardly through a cracking zone, passing charge hydrocarbons in direct contact with said material in said cracking zone, dropping heat transfer material cooled by contact with said charge as a continuous shower of separate granules through a fuel supply zone, continuously spraying a high boiling liquid hydrocarbon fuel into said shower to thereby apply fuel to the surface of said granules and vaporize a portion of said fuel, removing vapors so generated and adding said vapors to said charge hydrocarbons for direct contact with said heat transfer material in said cracking zone, transferring said granular material from said fuel supply zone to said heating zone, and passing air through said bed of granlar solid in said heating zone in concurrent flow with said downwardly moving bed to burn said fuel and heat said granules 2. A process for cracking hydrocarbons which comprises passing a granular solid heat transfer material downwardly through a heating zone as a compact moving bed, passing the heated material downwardly through a cracking zone, passing charge hydrocarbons in direct contact with said material in said cracking zone, dropping heat transfer material cooled by contact with said charge as a continuous shower of separate granules through a fuel supply zone, continuously spraying a high boiling liquid hydrocarbon fuel into said shower to thereby apply fuel to the surface of said granules and vaporize a portion of said fuel, removing vapors so generated and adding said vapors to said charge hydrocarbons for direct contact with said heat transfer material in said cracking zone, transferring said granular material from said fuel supply zone to said heating zone, and passing air through said bed of granular solid in said heating zone in countercurrent flow with said downwardly moving bed to burn said fuel and heat said granules.

3. A process for cracking hydrocarbons which comprises passing a granular solid heat transfer material downwardly through a heating zone as a compact moving bed, passing the heated material downwardly through a cracking zone, passing charge hydrocarbons in direct contact with said material in said cracking zone, dropping heat transfer material cooled by contact with said charge as a continuous shower of separate granules through a fuel supply zone, continuously spraying a high boiling liquid hydrocarbon fuel into said shower to thereby apply fuel to the surface of said granules and vaporize a portion of said fuel, removing vapors so generated and adding said vapors to said charge hydrocarbons for direct contact with said heat transfer material in said cracking zone, transferring said granular material from said fuel supply zone to said heating zone, and passing air through said bed of granular solid in said heating zone to burn said fuel and heat said granules.

4. A process for cracking hydrocarbons which comprises passing a granular solid heat transfer material downwardly through a heating zone as a compact moving bed, passing the heated material downwardly through a cracking zone, passing charge hydrocarbons in direct contact with said material in said cracking zone, dropping heat transfer material cooled by contact with said charge as a continuous shower of separate granules through a fuel supply zone, continuously spraying a fuel which is predominantly non-volatile at the temperature of granules in said shower into said shower to thereby apply fuel to the surface of said granules and vaporize a portion of said fuel, removing vapors so generated and adding said vapors to said charge hydrocarbons for direct contact with said heat transfer material in said cracking zone, transferring said granular material from said fuel supply zone to said heating zone, and passing air through said bed of granular solid in said heating zone to burn said fuel and heat said granules.

5. A process for cracking hydrocarbons which comprises passing a granular solid heat transfer material downwardly through a heating zone as a compact moving bed, passing the heated material downwardly through a cracking zone, passing charge hydrocarbons in direct contact with said material in said cracking zone, dropping heat transfer material cooled by contact with said charge as a continuous shower of separate granules through a fuel supply zone, continuously spraying powdered coal into said shower to thereby apply fuel to the surface of said granules and vaporize a portion of said fuel, removing vapors so generated and adding said vapors to said charge hydrocarbons for direct contact with said heat transfer material in said cracking zone, transferring said granular material from said fuel supply zone to said heating zone, and passing air through said bed of granular solid in said heating zone in concurrent flow with said downwardly moving bed to burn said fuel and heat said granules.

6. A process for heating a granular solid heat transfer material which comprises dropping said material as a continuous shower of discrete freely-falling granules through a fuel supply zone to a compact bed of said granules in the lower part of said zone, maintaining the top of said bed substantially at a predetermined level, continuously spraying a high boiling liquid fuel into said continuous shower, passing said granular material together with fuel applied thereon by said spray from said bed downwardly through a heating zone as a compact moving bed and passing air in direct contact with said granules in said last named bed to burn said fuel and thereby heat said granules.

7. A process for heating a granular solid heat transfer material which comprises dropping said material as a continuous shower of discrete freely-falling granules through a fuel supply zone to a compact bed of said granules in the lower part of said zone, maintaining the top of said bed substantially at a predetermined level, continuously spraying a fuel into said continuous shower, passing said granular material together with fuel applied thereon by said spray from said bed downwardly through a heating zone as a compact moving bed and passing air in direct contact with said granules in said last named bed to burn said fuel and thereby heat said granules.

8. A process for heating a granular solid heat transfer material which comprises dropping said material as a continuous shower of discrete freely-falling granules through a fuel supply zone to a compact bed of said granules in the lower part of said zone, maintaining the top of said bed substantially at a predetermined level, continuously spraying powdered coal into said continuous shower, passing said granular material together with fuel applied thereon by said spray from said bed downwardly through a heating zone as a compact moving bed and passing air in direct contact with said granules in said last named bed to burn said fuel and thereby heat said granules.

9. A process for heating a granular solid heat transfer material which comprises dropping said material as a continuous shower of discrete freely-falling granules through a fuel supply zone to a compact bed of said granules in the lower part of said zone, maintaining the top of said bed substantially at a predetermined level, continuously spraying a fuel into said continuous shower, passing said granular material together with fuel applied thereon by said spray from said bed downwardly through a transfer zone of restricted cross section to and through a heating zone as a compact moving bed and passing air in direct contact with said granules in said last named bed to burn said fuel and thereby heat said granules.

10. A process for heating a granular solid heat transfer material which comprises dropping said material as a continuous shower of discrete freely-falling granules through a fuel supply zone to a compact bed of said granules in the lower part of said zone, maintaining the top of said bed substantially at a predetermined level, continuously spraying a fuel into said continuous shower, passing said granular material together with fuel applied thereon by said spray from said bed downwardly through a heating zone as a compact moving bed and passing air in concurrent flow contact with said granules in said last named bed to burn said fuel and thereby heat said granules.

11. A process for heating a granular solid heat transfer material which comprises dropping said material as a continuous shower of discrete freely-falling granules through a fuel supply zone to a compact bed of said granules in the lower part of said zone, maintaining the top of said bed substantially at a predetermined level, continuously spraying a fuel into said continuous shower, passing said granular material together with fuel applied thereon by said spray from said bed downwardly through a heating zone as a compact moving bed and passing air in countercurrent flow contact with said granules in said last named bed to burn said fuel and thereby heat said granules.

12. A heater comprising a vertical shell, a supply conduit to admit granular solid material to the top of said shell; a conical spreader in the top of said shell below said conduit, a liquid spray device under said spreader, means to supply liquid to said device, a valve in said conduit, means below said spray device responsive to the level of a compact bed of solid controlling said valve, a plate across said shell below said last named means, a plurality of feed pipes extending downwardly from said plate, flow control means in the bottom of said shell for removing granular solid therefrom uniformly across said shell, means to admit air below said plate and means to withdraw gaseous products of combustion from the lower portion of said shell.

13. A heater comprising a vertical shell, a supply conduit to admit granular solid material to the top of said shell; a spreader in the top of shell below said conduit to deflect solids from said conduit toward said shell, a liquid spray device under said spreader, means to supply liquid to said device, a valve in said conduit, means below said spray device responsive to the level of a compact bed of solid controlling said valve, a plate across said shell below said last named means, a plurality of feed pipes extending downwardly from said plate, flow control means in the bottom of said shell for removing granular solid therefrom uniformly across said shell, means to admit air below said plate and means to withdraw gaseous products of combustion from the lower portion of said shell.

14. A heater comprising a vertical shell, a supply conduit to admit granular solid material to the top of said shell; a conical spreader in the top of said shell below said conduit, a liquid spray device under said spreader, means to supply liquid to said device, means to maintain a predetermined upper surface of a bed of granular solid in said shell, a plate across said shell below said last named means, a plurality of feed pipes extending downwardly from said plate, flow control means in the bottom of said shell for removing granular solid therefrom uniformly across said shell, means to admit air below said plate and means to withdraw gaseous products of combustion from the lower portion of said shell.

15. A heater comprising a vertical shell, a supply conduit to admit granular solid material to the top of said shell; a conical spreader in the top of said shell below said conduit, a liquid spray device under said spreader, means to supply liquid to said device, a valve in said conduit, control means below said spray device responsive to the level of a compact bed of solid controlling said valve, conduit means of restricted cross-section below said control means, means to divert solids through said conduit means, flow control means in the bottom of said shell for removing granular solid therefrom uniformly across said shell, means to admit air below said conduit means and means to withdraw gaseous products of combustion from the lower portion of said shell.

16. A heater comprising a vertical shell, a supply conduit to admit granular solid material to the top of said shell; spreader in the top of said shell below said conduit to deflect solids from said conduit toward said shell, a liquid spray device under said spreader, means to supply liquid to said device, control means to maintain a predetermined upper level of a bed of granular solid in said shell, conduit means of restricted cross-section intermediate the ends of said shell, means to divert downwardly moving granular solid through said conduit means, flow control means in the bottom of said shell for removing granular solid therefrom uniformly across said shell, means to admit air below said conduit means and means to withdraw gaseous products of combustion from the lower portion of said shell.

17. A heater comprising a vertical shell, a supply conduit to admit granular solid material to the top of said shell; a spreader in the top of said shell below said conduit to deflect solids from said conduit toward said shell, a liquid spray device under said spreader, means to supply liquid to said device, control means to maintain a predetermined upper level of a bed of granular solid in said shell, conduit means of restricted cross-section intermediate the ends of said shell, means to divert downwardly moving granular solid through said conduit means, means to admit air below said conduit means and means to withdraw gaseous products of combustion from the lower portion of said shell.

ERNEST UTTERBACK.

REFERENCES CITED

The following references are of record in the file of this patent:

UNITED STATES PATENTS

| Number | Name | Date |
|---|---|---|
| 1,394,043 | Smith I | Oct. 18, 1921 |
| 1,450,327 | Meischke-Smith | Apr. 3, 1923 |
| 1,490,862 | Smith II | Apr. 15, 1924 |
| 1,643,401 | Yard et al. | Sept. 27, 1927 |
| 1,668,967 | Smith III | May 8, 1928 |
| 1,985,304 | Warner | Dec. 25, 1934 |
| 2,073,553 | Dienst | Mar. 9, 1937 |
| 2,312,006 | Thiele | Feb. 23, 1943 |
| 2,323,501 | Tuttle | July 6, 1943 |
| 2,386,670 | Evans | Oct. 9, 1945 |
| 2,387,378 | Wolk | Oct. 23, 1945 |
| 2,390,031 | Schutte | Nov. 27, 1945 |
| 2,396,709 | Leffer | Mar. 19, 1946 |
| 2,426,848 | Tuttle | Sept. 2, 1947 |